United States Patent Office 3,231,539
Patented Jan. 25, 1966

3,231,539
PROCESS FOR THE MANUFACTURE OF SPIN-
NING SOLUTIONS OF POLY-β-LACTAMS BY
DISSOLVING IN AN ALCOHOLIC SOLUTION OF
CALCIUM THIOCYANATE
Hans Hoyer, Frankfurt am Main, Horst Behrenbruch,
Kelkheim, Taunus, and Karl Börner, Bobingen, near
Augsburg, Germany, assignors to Farbwerke Hoechst
Aktiengesellschaft vormals Meister Lucius & Brüning,
Frankfurt am Main, Germany, a corporation of Germany
No Drawing. Filed May 29, 1962, Ser. No. 198,446
Claims priority, application Germany, June 2, 1961,
F 34,073
14 Claims. (Cl. 260—33.4)

It is possible to prepare fibres or filaments from the known polyamides either by spinning from the melt or by wet spinning. If the carbon chain of the polyamides is reduced to two chain members between the periodic atom grouping CO—NH—, as is the case with the β-polyamides, these polymers will decompose while liberating ammonia when spun from the melt because of their elevated melting points. Therefore, the spinning of β-polyamides, especially of poly-β-lactams, requires the use of appropriate solvents. It is unfavourable to use aggressive solvents or solvents having decomposing properties, such as concentrated sulfuric acid and dichloroacetic acid, although these acids dissolve β-polyamides already in the cold. Inert solvents, such as nitrobenzene, dimethyl formamide or dimethyl sulfoxide, which dissolve β-polyamides only at temperatures above 130° C., are likewise unsuitable; besides the β-polyamides will be separated while these solutions are cooled. It is well known to dissolve super-polyamides in alcoholic solutions of inorganic salts, such as potassium chloride, calcium nitrate, magnesium chloride and magnesium nitrate. These solutions, however, are also not suitable for the preparation of stable spinning solutions.

Now, it has been found that easily filterable and, above all, stable spinning solutions of poly-β-lactams, especially of poly-β-methyl-β-butyrolactam, can be produced by using as solvents alcoholic solutions of calcium thiocyanate, the weight proportion of poly-β-lactam and calcium thiocyanate amounting to 1:1.3 to 1:1.8, and the calcium thiocyanate being present in a concentrataion of 20 to 28%, preferable 23 to 26%.

It was surprising that poly-β-lactams are easily soluble in cold alcoholic solutions of calcium thiocyanate, since under the same conditions this salt has even proved to be a precipitant for polyamides (cf. German Patent 737,950, page 2). It is a remarkable fact that sodium thiocyanate, potassium thiocyanate, ammonium thiocyanate and cadmium thiocyanate do not dissolve poly-β-lactams under the same conditions. Also the alcoholic solutions of calcium and magnesium nitrates and chlorides, known as solvents for poly-amides having a greater number of chain members between the CO—NH—groups, such as polycaprolactam and poly-hexamethylene adipic acid amide, are not suitable for the preparation of spinning solutions of the polymeric β-lactams.

The solutions obtained when the proportion of poly-β-lactam and calcium thiocyanate is increased in favour of the salt, are less suitable in spinning technique because of their high salt content. In case the batch contains a higher quantity of alcohol so that a solution having a concentration of calcium thiocyanate is produced, while the proportion by weight of poly-β-lactam and calcium thiocyanate is kept within the range of 1:1.3 to 1:1.8, solutions are obtained which are only difficultly filterable.

If these solutions were to be spun in spite of this fact, they must undergo an elongated centrifugation procedure before being filtered. The centrifugation residues of such solutions admittedly are very small and always range below 0.2% of the dissolved poly-β-lactam, but even extremely small amounts of gelatinous particles will cause an obstruction of the filters. Although such centrifugated and subsequently filtered solutions may be easily spun in the beginning, they unfortunately show a steady increase in viscosity which finally leads to the coagulation of the solution. The above-mentioned increase in viscosity and the initial coagulation may be almost reversed by mechanically treating the aged solution (thixotropic effect), but the solutions again liquefied are even more unstable than the starting solutions; they will coagulate again after a still faster increase in viscosity. A prolonged aging of the gelatinized solution renders impossible the liquefaction of the mixture by a mechanical treatment; an irreversible aggregation of the macromolecules has taken place, characterized by the fact that it may be annulled by heating the mixture and simultaneously distilling off the alcohol until the necessary concentration of calcium thiocyanate is again reached, whereby a well filterable and stable solution is again obtained. It results therefrom that only alcoholic solutions of calcium thiocyanate of 20 to 28% by weight are suitable for the preparation of the spinning solutions claimed.

In order to obtain readily filterable solutions, it is of advantage first to prepare more concentrated solutions and subsequently to dilute them down to the concentration necessary for the spinning procedure. A solution prepared under these conditions is readily filterable and also stable for a sufficient period of time. It is also possible to use calcium thiocyanate containing water of crystalization, the amount of water, however, must not exceed 6.5 moles. In case anhydrous calcium thiocyanate is used, it is possible to add up to 6.5 mols of water, in one or several portions, to the alcohols used for dissolving the thiocyanate.

If the calcium thiocyanate contains crystal water, or if, because of technical reasons, small amounts of water are added at the expense of the amount of alcohol, the dissolution of the β-poly-amide proceeds much more slowly. In the beginning, such solutions advantageously contain a large amount of calcium thiocyanate. They must subsequently be diluted with alcohol to a content of 20–28% by weight of calcium thiocyanate.

Instead of calcium thiocyanate, the β-poly-amide spinning solutions may also be prepared from manganese thiocyanate, magnesium thiocyanate, aluminum thiocyanate, zinc thiocyanate, barium thiocyanate, strontium thiocyanate or lithium thiocyanate. The thiocyanate concentration necessary, however, is different for each product and in any case higher than that of calcium thiocyanate. Since the spinning capacity of the solutions decreases with increasing salt concentration, the spinning solutions are most favourably prepared with calcium thiocyanate solutions.

The alcohols to be used are: ethyl alcohol or butyl alcohol, especially, however, methyl alcohol which is particularly suitable for the preparation of the spinning solutions.

According to the process of the present invention, there may be produced spinning solutions of all kinds of β-poly-amides, especially β-polylactams; for example: β-methyl-β-butyrolactam, α,β-dimethyl-β-butyrolactam, α,α,β-trimethyl-β-butyrolactam, β-carbomethoxy-β-butyrolactam.

According to the present invention it is also possible to prepare spinning solutions from copolymers of β-lactams, provided that they are not soluble in alcohols and do not require an addition of calcium thiocyanate. Suitable copolymers are, for example: copolymers of 75 to 99% of β-methyl-β-butyrolactam and 25 to 1% of β-methyl-β- caprolactam, or a copolymer consisting of 3 components, i.e. 90% of β-methyl-β-butyrolactam, 6% of β-phenyl-β-propiolactam, and 4% of β-methyl-β-caprolactam; further there may be used copolymers of β-methyl-β-caprolactam, β-methyl-β-valerolactam, and β-ethyl-β-valerolactam.

The following examples serve to illustrate the present invention but they are not intended to limit it thereto.

*Example 1*

In a kneading apparatus, 425 grams of poly-β-methyl-β-butyrolactam (relative viscosity 14.3; dissolved in sulfuric acid of 1% strength) are suspended in 1388 grams of methyl alcohol; 1020 grams of calcium thiocyanate containing 4.15 moles of crystal water, which correspond to 690 grams of anhydrous calcium thiocyanate, are introduced into this mixture. During the introduction of the salt, a quick dissolution of the polymer takes place readily in the cold. The whole is subsequently stirred for 5 to 8 hours and filtered in a pressure filter through a filtering layer of wadding and cambric and subsequently through a filtering layer of wadding and 1 mm. of cotton paper pasteboard. In the determination of the viscosity, a ball takes 450 sec. to fall through a polyamide solution of 15% strength at a temperature of 25° C. (steel ball, diameter 3 mm.). The highly viscous solution is cautiously diluted with methyl alcohol to a polyamide content of 13%; after the dilution, the ball still takes 40 sec. to fall and in the solution of 13% strength, the time of fall slowly increases after 90 hours from 40 to 53 sec. When diluted to a 12.5% content of poly-β-lactam, the fall of the ball only takes 24 sec.; this solution, however, will coagulate after 66 hours.

*Example 2*

In a kneading apparatus, 294 grams of poly-β-methyl-β-butyrolactam (relative viscosity 10.6%; dissolved in sulfuric acid of 1% strength) are mixed with 946 grams of calcium thiocyanate containing 4.15 moles of crystal water, which correspond to 648 grams of anhydrous calcium thiocyanate, and subsequently a mixture of 122 grams of methyl alcohol and 64 grams of water is introduced. The polymer is rapidly dissolved in the cold. In order to obtain a total dissolution of the polymer, the whole is agitated for 3 to 5 hours and filtered in the way described in Example 1. The ball takes 139 sec. to fall through the filtered solution of 15% strength at a temperature of 25° C., (ball diameter 3 mm.); after the dilution to a poly-β-lactam content of 14%, the fall of the ball still takes 70 sec. and after a 5 days' time of abandonment, 72 sec. The solution practically has a stable viscosity. If it is diluted to 13%, the fall of the ball decreases to 40 sec., the solution quickly turns viscous and will coagulate after 5 days.

*Example 3*

In a glass flask, 34.1 grams of poly-β-methyl-β-butyrolactam are mixed with 71.4 grams of calcium thiocyanate containing 1.95 moles of water, which corresponds to 58.4 grams of anhydrous calcium thiocyanate, and subsequently 122 grams of methyl alcohol are slowly added. After 2 hours, the solution is filtered through a pressure filter as described in Example 1. The fall of the ball then takes 140 sec., after 5 days it takes 143 sec., at a temperature of 25° C. (ball diameter 0.3 mm.).

We claim:
1. Process for the preparation of a readily filterable and stable spinning solution of a poly-β-lactam which comprises dissolving said poly-β-lactam in a solution of calcium thiocyanate in an alcohol of up to four carbon atoms, the relative proportions by weight of said lactam and said thiocyanate being within the range of 1:1.3 to 1:1.8 and the concentration of calcium thiocyanate in alcohol being from 20 to 28% by weight.

2. A process as defined in claim 1 wherein the poly-β-lactam is a member selected from the group consisting of polymers of β-methyl-β-butyrolactam, α,β-dimethyl-β-butyrolactam, α,α,β-trimethyl-β-butyrolactam, β-carbomethoxy-β-butyrolactam, copolymers thereof with β-methyl-β-caprolactam and β-phenyl-β-propiolactam, and copolymers of β-methyl-β-caprolactam, β-methyl-β-valerolactam and β-ethyl-β-valerolactam.

3. A process as defined in claim 1 wherein the poly-β-lactam is a poly-β-methyl-β-butyrolactam.

4. A process as defined in claim 1 wherein the concentration of calcium thiocyanate in alcohol is from 23 to 26% by weight.

5. A process as defined in claim 1 wherein the alcohol is a member selected from the group consisting of methyl, ethyl, and butyl alcohols.

6. A process as defined in claim 1 wherein the alcohol is methyl alcohol.

7. A process as defined in claim 1 wherein the alcoholic solution contains no more than 6.5 mols of water per mol of anhydrous calcium thiocyanate.

8. A readily filterable and stable spinning solution of a poly-β-lactam dissolved in a solution of calcium thiocyanate in an alcohol of up to four carbon atoms, the relative proportions by weight of said lactam and said thiocyanate being within the range of 1:1.3 to 1:1.8 and the concentration of calcium thiocyanate in alcohol being from 20 to 28% by weight.

9. A spinning solution as defined in claim 8 wherein the poly-β-lactam is a member selected from the group consisting of polymers of β-methyl-β-butyrolactam, α,β-dimethyl-β-butyrolactam, α,α,β-trimethyl-β-butyrolactam, β-carbomethoxy-β-butyrolactam, copolymers thereof with β-methyl-β-caprolactam and β-phenyl-β-propiolactam, and copolymers of β-methyl-β-caprolactam, β-methyl-β-valerolactam and β-ethyl-β-valerolactam.

10. A spinning solution as defined in claim 8 wherein the poly-β-lactam is poly-β-methyl-β-butyrolactam.

11. A spinning solution as defined in claim 8 wherein the concentration of calcium thiocyanate is from 23 to 26% by weight.

12. A spinning solution as defined in claim 8 wherein the alcohol is a member selected from the group consisting of methyl, ethyl, and butyl alcohols.

13. A spinning solution as defined in claim 8 wherein the alcohol is methyl alcohol.

14. A spinning solution as defined in claim 8 containing not more than 6.5 mols of water per mol of anhydrous calcium thiocyanate.

References Cited by the Examiner
UNITED STATES PATENTS
3,079,219   2/1963   King _____ 264—168

MURRAY TILLMAN, *Primary Examiner.*

JAMES A. SEIDLECK, *Examiner.*